3,114,601
Patented Dec. 17, 1963

3,114,601
METHOD OF TREATING MAGNESIUM FLUORIDE AND PRESSED BODIES MADE THEREBY
Eugene C. Letter, Walworth, N.Y., assignor to Bausch & Lomb Incorporated, Rochester, N.Y., a corporation of New York
No Drawing. Filed Sept. 30, 1960, Ser. No. 59,495
1 Claim. (Cl. 23—88)

This invention relates to an improved method of treating magnesium fluoride and to improved compressed magnesium fluoride bodies made thereby.

The production of infrared transmitting windows and other optical elements made of hot pressed magnesium fluoride is of increasing importance. Such elements are generally characterized by relatively high transparency to infrared radiation and are often capable of relatively high transmission of radiation at wave lengths up to about 10 microns. Previous magnesium fluoride bodies are not uniformly transparent to infrared radiation throughout all regions of their so-called transmission spectra, but exhibit so-called absorption bands, which are undesirable in many applications. Absorption bands at about 2.8, 5.0, and 6.7 microns wave length as well as the so-called water absorption bands at 3.0 and 6.1 microns are particularly troublesome in the development of high quality infrared transmitting elements made of magnesium fluoride.

Accordingly, one important object of the present invention is to provide a novel method of treating magnesium fluoride to improve the infrared transmission characteristics of optical elements made of this material.

Another object is to provide improved infrared transmitting windows and other optical elements made of hot pressed magnesium fluoride.

Briefly, the invention contemplates treating pulverulent magnesium fluoride at elevated temperatures with a fluorine containing material capable of releasing hydrofluoric acid, or a similarly reactive fluorine compound at the treatment temperature. It has been found that such treatment is remarkably effective in reducing the infrared absorption of optical elements made of magnesium fluoride, and provides thereby a substantial improvement in the performance characteristics of the optical elements.

The treatment is preferably carried out prior to the hot pressing process, with the fluoride material in a loose, pulverulent condition. Alternatively, the treatment may be undertaken simultaneously with the hot pressing, in which case the material is preferably not densely preformed, but is placed either loosely or as a porous, preformed body in the hot press apparatus.

In practice, the time of treatment is relatively unimportant, and may be varied over a relatively wide range, depending on the degree of improvement desired in the transmission characteristics and on the particle size of the magnesium fluoride. The temperature also may be varied within relatively wide limits. Generally, close to optimum results are achieved by heating the magnesium fluoride for at least about an hour at a temperature of at least 400° C. The optimum temperature range appears to be from about 400° to about 600° C. Heating at temperatures below about 400° C. requires relatively longer times to achieve equivalent results. Temperatures above 600° C. may also be used, depending upon the condition of the magnesium fluoride, but at the risk of adverse effects such as a reduction in the ease with which the magnesium fluoride may be hot pressed, and an increase in radiation scattering in hot pressed bodies made of the magnesium fluoride, which effects are thought to be due to impurities sometimes present in the magnesium fluoride.

With regard to the time of heating a relatively large proportion of the improvement appears to be accomplished relatively quickly, within the first ten to fifteen minutes after the material reaches the treatment temperature. Heating for longer than about one hour appears to produce only negligible further improvement, except in those cases where the effective particle size of the magnesium fluoride is unusually large, or for other reasons the exposed surface area of the magnesium fluoride is relatively restricted.

Specific examples of materials that have been found to be advantageous for use in the practice of the invention are fluorine, hydrofluoric acid, anhydrous hydrofluoric acid, ammonium fluoride and ammonium bifluoride. Many other materials are available, and capable of producing similar results. Such materials may be in the form of normally reactive fluorine compounds, or normally non-reactive fluorine compounds that are heat decomposable to release reactive fluorine or compounds thereof. In order to minimize hazards to personnel and equipment, it is preferred to use a non-reactive fluorine compound such as, for example, ammonium fluoride, which is heat decomposable at the treatment temperature and at this temperature yields either elemental fluorine or a reactive fluorine compound.

According to a preferred embodiment of the invention, magnesium fluoride in pulverulent form, and of a particle size smaller than about 100 mesh, is treated by wetting it with an aqueous solution of ammonium fluoride, drying at about 125° C., and then heating it at a temperature of about 400° C. for about one hour. The concentration of the ammonium fluoride solution is not critical, but the total amount of ammonium fluoride in the solution received by the magnesium fluoride is preferably about 5 wgt. percent of the quantity of magnesium fluoride. Preferably, the treatment is carried out in an unventilated chamber in order to maximize the atmospheric concentration of the reactive compounds liberated by the decomposition of the ammonium fluoride. After treatment, the magnesium fluoride may be hot pressed by known techniques to form it into a cohesive, shaped body, which may be ground and polished to form an infrared transmitting optical element having improved transmission characteristics, particularly in respect of absorption bands and transmission at relatively long wave lengths.

According to another embodiment of the invention, magnesium fluoride in pulverulent form, preferably of a particle size less than 100 mesh, is wetted with concentrated aqueous hydrofluoric acid. The acid is merely poured over the magnesium fluoride to wet the magnesium fluoride thoroughly, after which the excess acid is poured off. The wetted magnesium fluoride is then placed in an unventilated Alundum tube, heated to a temperature of about 500° C., and maintained at this temperature for about one hour or longer. The magnesium fluoride is then ready for hot pressing to form optical elements having improved infrared transmission characteristics.

According to a third embodiment of the invention, the pulverulent magnesium fluoride is placed in a boat in an Alundum tube and heated to about 400° to 500° C. in an anhydrous hydrofluoric acid atmosphere, which is maintained by flowing anhydrous hydrofluoric acid through the tube. Treatment by exposure to anhydrous hydrofluoric acid has been found to be of some benefit to the magnesium fluoride even at room temperatures, since the anhydrous hydrochloric acid appears to dissolve and carry away certain impurities from the magnesium fluoride. Best results from this treatment, however, have been obtained at elevated temperatures of at least about 400° C.

After treatment by exposure to the anhydrous hydrofluoric acid for about an hour, the magnesium fluoride is ready for hot pressing to form optical elements of improved transmission characteristics.

According to yet another embodiment of the invention, dry fluorine is used to treat magnesium fluoride in generally similar fashion as hereinabove described with respect to anhydrous hydrofluoric acid, and with generally similar results. The dry fluorine is flowed through the tube in which the pulverulent magnesium fluoride is heated at a temperature of about 400 to 600° C.

The treatment according to the invention need not be completed prior to the hot pressing of the magnesium fluoride. Alternatively, the reactive material may be added to the magnesium fluoride prior to hot pressing, and the hot pressing operation itself may constitute the heating step.

According to this modification, the magnesium fluoride is treated by wetting it with anhydrous hydrofluoric acid, or with an aqueous solution of ammonium fluoride, ammonium bifluoride or hydrofluoric acid. It is then preferably, but not necessarily, dried, and is then ready for hot pressing. The material so treated may be lightly cold pressed to form a relatively low density, highly porous pre-form, which is then placed in the hot press die and reacted in the die at a temperature of at least about 400° C. for at least about ten minutes prior to the application of pressure. The mass is then heated to the desired hot pressing temperature, and pressed at the usual pressures. Alternatively, depending upon the nature of the hot pressing equipment, the magnesium fluoride may be placed in the hot press die in a loose, pulverulent state without preforming. Also, whether the magnesium fluoride is made into a pre-form or placed loosely in the die, the treatment may be carried out in the die prior to the application of the hot pressing pressure by flowing a reactive gas such as dry fluorine or anhydrous hydrofluoric acid through the magnesium fluoride as it rests in the die, following the procedures hereinabove described with respect to temperatures and times.

Although the chemistry of the present invention is not definitely understood, it is presently believed that the improvement achieved, aside from reduction of absorption in the so-called water absorption bands due to the dehydrating effect of anhydrous hydrofluoric acid or an equivalent is due to a reduction of the number of OH$^-$ ions, which are thought to be present in even the purest magnesium fluoride heretofore obtainable. The evidence presently at hand developed in connection with the present work suggests that the absorption bands at 2.8, 5.0, and 6.7 microns wavelength are due to absorption by OH$^-$ ions, or substituted OH$^-$ ions in the magnesium fluoride lattice. Treatment according to the present invention, thus, appears to provide an environment in which the equilibrium strongly favors the substitution of F$^-$ ions for OH$^-$ ions in association with magnesium.

This theory is consistent with the improvement achieved by the use of dry fluorine upon the reasonable supposition that the fluorine combines with even the relatively small quantities of water unavoidably present in the magnesium fluoride to form hydrofluoric acid, which then reacts with the OH$^-$ content of the magnesium fluoride.

I claim:

Method for treating magnesium fluoride to improve the infrared transmission characteristics thereof comprising wetting a mass of loose pulverulent magnesium fluoride of a particle size smaller than about 100 mesh with an aqueous solution of ammonium fluoride, the total quantity of ammonium fluoride in said aqueous solution being about five weight percent of the quantity of magnesium fluoride, drying the wet pulverulent magnesium fluoride at about 125° C., and then placing the mixture in an Alundum tube for about one hour at a temperature of between 400° and 600° C., placing the treated material in a die and hot pressing the resulting mass to thereby form a shaped body.

References Cited in the file of this patent

UNITED STATES PATENTS

| Number | Name | Date |
| --- | --- | --- |
| 2,410,616 | Webb | Nov. 5, 1946 |
| 2,498,186 | Stockbarger et al. | Feb. 21, 1950 |
| 2,550,173 | Swinehart et al. | Apr. 24, 1951 |
| 2,717,225 | Williams | Sept. 6, 1955 |
| 2,982,053 | Elmer | May 2, 1961 |

OTHER REFERENCES

Mellor: "Comprehensive Treatise on Inorganic and Theoretical Chemistry," vol. 4, page 296 (1923). Longmans, Green and Co., N.Y.